Dec. 27, 1938. J. W. BRYCE 2,141,599
CHECKING DEVICE FOR MULTIPLYING MACHINES
Filed July 3, 1936 7 Sheets-Sheet 1

Dec. 27, 1938.  J. W. BRYCE  2,141,599
CHECKING DEVICE FOR MULTIPLYING MACHINES
Filed July 3, 1936  7 Sheets-Sheet 2

INVENTOR
James W. Bryce
BY
Cooper, Kerr & Dunham
ATTORNEYS

Dec. 27, 1938.　　　　　J. W. BRYCE　　　　　2,141,599
CHECKING DEVICE FOR MULTIPLYING MACHINES
Filed July 3, 1936　　　7 Sheets-Sheet 4

FIG. 3b.

INVENTOR
James W. Bryce
BY
Cooper, Kerr & Dunham
His ATTORNEYS

Dec. 27, 1938.    J. W. BRYCE    2,141,599
CHECKING DEVICE FOR MULTIPLYING MACHINES
Filed July 3, 1936    7 Sheets-Sheet 5

FIG. 3c.

INVENTOR
James W. Bryce
BY
Cooper, Kerr & Dunham
his ATTORNEYS

Dec. 27, 1938.   J. W. BRYCE   2,141,599
CHECKING DEVICE FOR MULTIPLYING MACHINES
Filed July 3, 1936   7 Sheets-Sheet 6

INVENTOR
James W. Bryce
BY
Cooper, Kerr & Dunham
his ATTORNEYS

Dec. 27, 1938.   J. W. BRYCE   2,141,599
CHECKING DEVICE FOR MULTIPLYING MACHINES
Filed July 3, 1936   7 Sheets-Sheet 7

INVENTOR
James W. Bryce
BY
Cooper, Kerr & Dunlap
his ATTORNEYS

Patented Dec. 27, 1938

2,141,599

UNITED STATES PATENT OFFICE 2,141,599

CHECKING DEVICE FOR MULTIPLYING MACHINES

James W. Bryce, Glen Ridge, N. J., assignor to International Business Machines Corporation, New York, N. Y., a corporation of New York Application July 3, 1936, Serial No. 88,805

10 Claims. (Cl. 235—61.7)

This invention relates to improvements in checking devices for record controlled multiplying machines. In previous checking arrangements for machines of this class, provision has been made for reading the product amount from a previously computed card and for entering this previously computed product amount into a receiving means of the machine at the time the factors were entered into their respective receiving means. For example, according to Oldenboom Patent No. 1,944,655, the product was entered into an SC accumulator at the time the factors were entered into the MP and MC receiving devices. Provision was also made for reversing the entry relations of the multiplier and multiplicand. Thereafter the calculation was carried out and following the RH and LH transfer cycle there was a comparing cycle in which the amount standing in LH was transferred in complementary form into SC. If the recomputed product checked with the previously recorded product which previously stood in SC, the SC accumulator would be brought back to zero and a new card feeding operation immediately initiated. Subsequently, a further cycle was required to clear the LH accumulator. If the Oldenboom patent be referred to an extra cycle will appear at the extreme right on Fig. 17a and the LH clearing cycle will appear at the second cycle from the extreme right of Fig. 17b. The extra cycle to the extreme left of Fig. 17b is a supplemental cycle required for SC reset when the recomputed product and the previously recorded product do not compare.

It will be seen from the foregoing that on checking operations there is required a comparing cycle which is an extra cycle and there is also required the customary LH reset cycle.

In the use of these machines for checking purposes, it is, of course, desirable that the checking time be reduced to a minimum. Any extra or additional cycles increase the time required for checking.

The present invention has for its object the provision of means for checking of such nature that extra cycles can be dispensed with and checking operations speeded up accordingly.

A further object of the present invention resides in the provision of checking means which will enable at least two machine cycles to be saved for each card checked.

A further object of the present invention resides in the provision of means to bring the result receiving device back to zero as an incident to a matching comparison upon checking, whereby no LH reset is required when the card properly checks.

A further object of the present invention resides in the provision of novel test means to ascertain that a check condition exists with novel means to immediately initiate a new card feed without intervening cycles when a card properly checks.

A further object of the present invention resides in the provision of a re-coordinated relation of circuits with a common switching means which will enable a single manipulation to shift the machine from regular multiplying to checking with maintained plugging for either type of operation.

A further object of the present invention resides in the provision of a supplemental accumulator used for visual comparison in case a card fails to check, with means for controlling it so that it may reset automatically after the machine is started, following the removal of the card which fails to check.

A further object is to provide means affording a special marking when a card checks.

A further object of the present invention is to provide means to release a card and allow it to be moved to eject position on checking.

Further and other objects of the present invention will be hereinafter set forth in the accompanying specification and claims and shown in the drawings which show by way of illustration a preferred embodiment and the principle thereof and what I now consider to be the best mode in which I have contemplated of applying that principle. Other embodiments of the invention employing the same or equivalent principle may be used and structural changes made as desired by those skilled in the art without departing from the present invention and within the spirit of the appended claims.

Before describing the details of the machine, a general explanation will be given of the principles of operation.

Figures 4, 5:
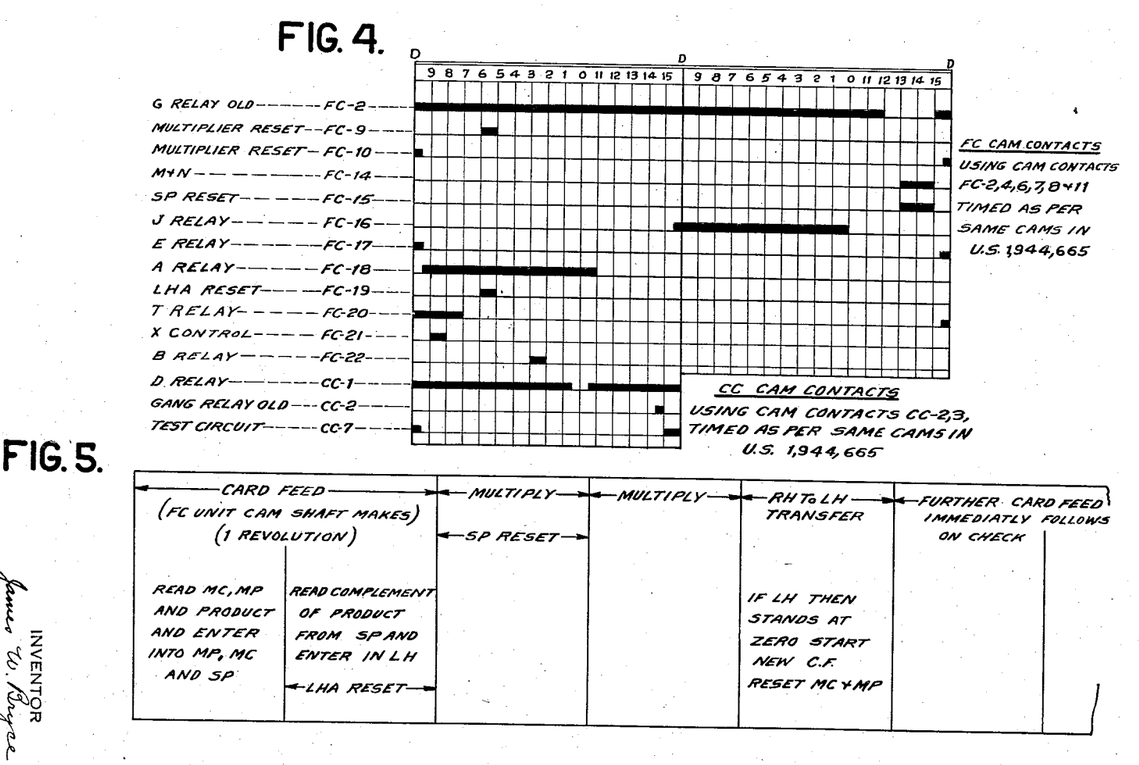
Fig. 4 is a cam contact timing diagram, showing the timing relations of new cams in relation to the timing of cam contacts of the prior art.
Fig. 5 is a sequence of operation, cycle diagram with legends showing the sequence of operations.

By referring to Fig. 5, it will be noted that the so-called card feed cycle comprises two machine or accumulator cycles. On the first of these machine cycles, the multiplier and multiplicand are entered with reverse entry relations into MP and MC. During this same cycle the previously recorded product is read from the card and entered into the SP accumulator. On the next subsequent machine cycle, the complement of the product standing in SP is read out of SP and entered into the LH accumulator. Multiplying operations then occur in the usual way. Following the multiplying operations there is the customary RH to LH transfer cycle. When this cycle is complete, if the recomputed product compares with the previously recorded product the LH accumulator will stand at zero. Accordingly, by testing the LH accumulator for this zero status at this stage of the operation, test may be made to see whether the results are correct or not. If the results are correct there can be an immediate automatic re-initiation of card feed for a following card with the attendant checking operations for such following card. It will also be noted that with this method of procedure no cycle whatsoever is required for LH reset because LH reset is brought about automatically by a proper checking operation.

From the foregoing, it will be seen that with the checking arrangements of the instant machine, three cycles can be wholly eliminated on check runs. The cycles which are eliminated with respect to machines of the prior art comprise the "compare LH with SC cycle" (last cycle to the right of Fig. 17a of Oldenboom) and the "LH or products reset cycle" (Fig. 17b of Oldenboom). The extra cycle for SC reset required in Oldenboom can also be eliminated since SP reset (which generally corresponds with SC reset in Oldenboom) is effected during a regular multiplying cycle.

Figures 1, 2:
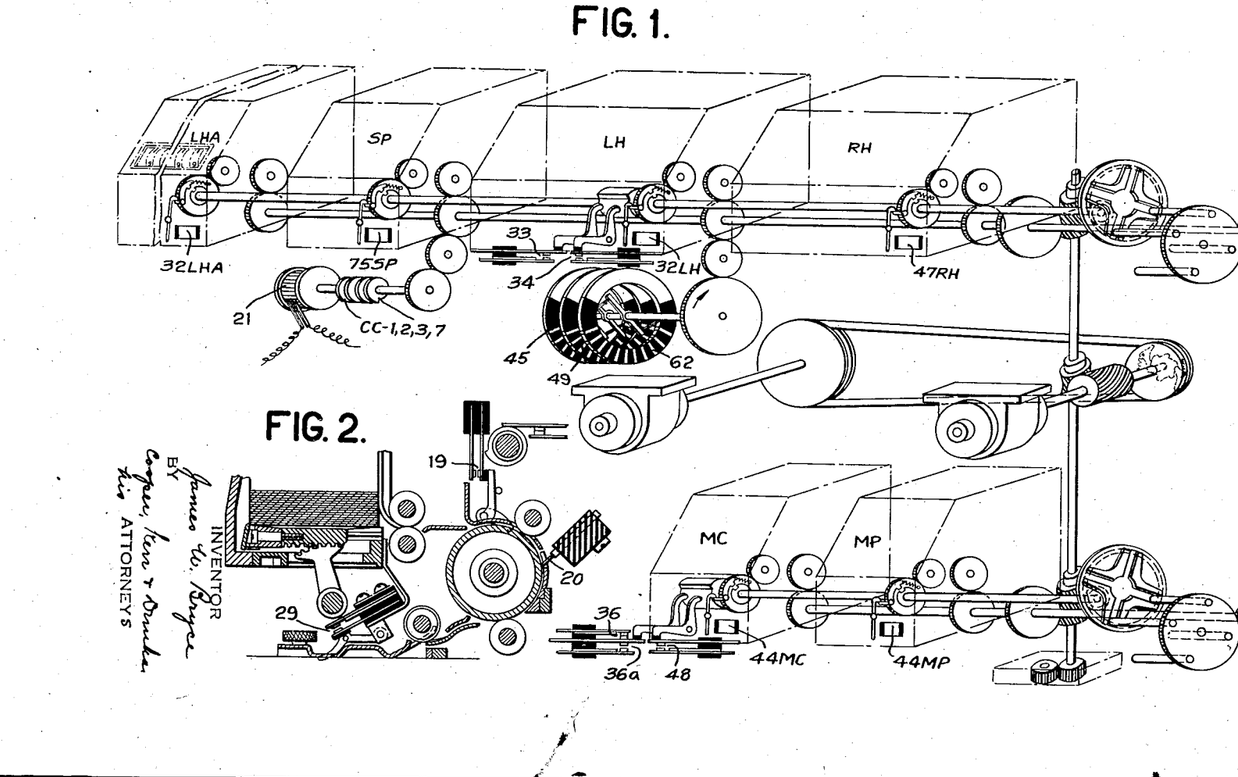
Figures 1 and 1a, taken together, with Fig. 1a to the right of Fig. 1, show diagrammatically the position of the various units of the machine, the manner of drive, etc.
Fig. 2 is a sectional view of the card handling and feeding section of the machine.

The machine to which the present invention is shown applied, is of a type well known in the art and for this reason no detailed mechanical description of the same is necessary. Reference may be had to the United States patents to Cunningham, No. 1,933,714 and Oldenboom, No. 1,944,655 and Daly, No. 2,045,437 for details of operation, an explanation of the mechanical arrangement of the card handling and card reading mechanism, accumulators and accumulator drive, punching devices, etc. The machine, however, is generally shown in Figs. 1, 1a and 2 wherein similar reference numerals are used to correspond to the showing on the circuit diagram.

The machine comprises an RH accumulator designated RH (Fig. 1), an LH accumulator designated LH, a supplemental LH accumulator designated LHA, an SP accumulator designated SP, which accumulator is used both as a summary products accumulator on regular multiplying operations and for checking purposes during check runs. The usual MP and MC receiving devices are also provided. Emitters 45, 49 and 62 are also provided, driven in the customary manner from the main counter drive shaft. There is also an impulse distributor 21 and cam contacts CC—1, CC—2, CC—3 and CC—7. The FC cams are driven as shown in Fig. 1a and comprise seventeen FC cams, FC—2, 4, 6, 7, 8, 9, 10, 11, 14, 15, 16, 17, 18, 19, 20, 21 and 22.

Figure 1A:
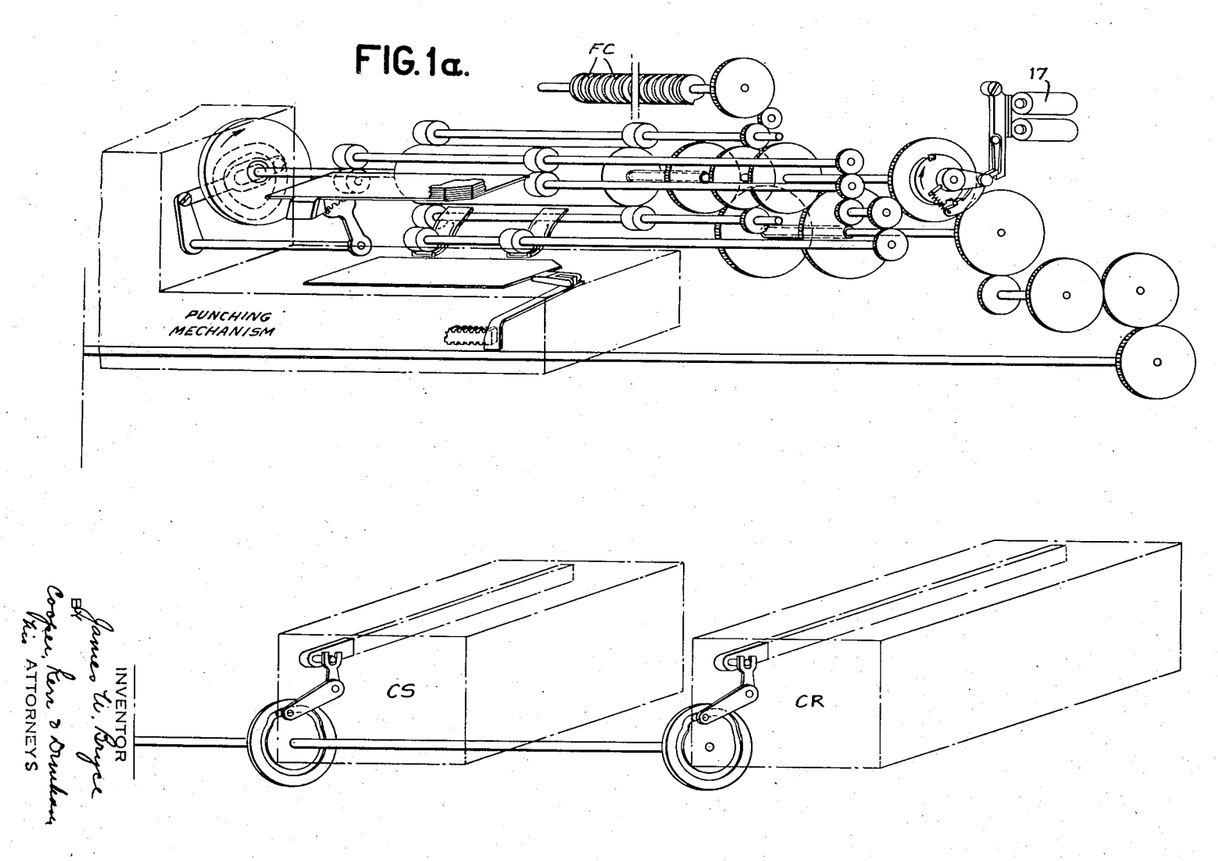

The machine includes the customary punching mechanism shown in dotted lines on Fig. 1a and like the corresponding punch of the Oldenboom or Daly patent.

There is also a CS and CR relay section shown in Fig. 1a and driven in the customary manner.

The present machine in addition to being adaptable for use as a checking machine for checking the results of previous computations, is also adapted for first run computations wherein factors are derived from a card, the factors multiplied to obtain a product and the product recorded by punching back on the record.

Before describing the checking features specifically, the operation of the machine for first run calculations will be briefly explained.

*Circuit diagram*

With pre-punched cards in the card magazine, the operator closes switch 10 (Fig. 3d), providing card supply for the main driving motor Z, which then drives the A.C.—D.C. generator 12, the D.C. section supplies direct current to D. C. buses 13 and 14 and the A. C. section supplies alternating current impulses to ground and to bus 15. (See Fig. 3a.) The start key is now depressed to close start key contacts 16 (Fig. 3d) and complete a circuit from the D. C. bus 13, through relay coil C, through start key contacts 16, relay contacts G—1 now closed, through cam contacts FC—2 to the 14 line. A stick circuit is established through the contacts C—2 and through cam contacts FC—8. Relay contacts C—1 are also closed and a circuit is established through contacts F—1, through card feed clutch magnet 17 (see also Fig. 1a), through cam contacts FC—6, through the stop key contacts 18, through relay contacts N—1 and C—1, through the punch contacts P—1 now closed and back to the other side of the line. As is customary in machines of this type the start key must be held depressed for the first four machine cycles in starting up on a run or alternatively, it may be depressed and released and then depressed a second time. Starting is prevented until the feed rack of the punch is in right hand position, this being provided for by the usual P—1 contacts. The first complete card feed cycle on starting up will advance the first card to the point where the supplemental card lever contacts 19 (Fig. 2) are closed, in which position the 9 index point position of the card will be about ready to pass under main sensing brushes 20MC and 20MP. At the beginning of the second card feed cycle, the card traverses the brushes and the multiplier and multiplicand are read and entered into MP and MC. With card lever contacts 19 closed, relay coil H (Fig. 3d) will be energized, shifting relay contacts H—1 (Fig. 3a) to reverse position from that shown. As the second card feed cycle ensues, the card is carried past the brushes and the amounts are entered in the usual way.

Briefly the entry circuits may be traced as follows: Current flows from the A. C. line 15 (Fig. 3a), through H—1, through FC—7, through the impulse distributor 21, to card transfer and contact roll 22, through the brushes 20MP pertaining to the multiplier and 20MC pertaining to the multiplicand to plug sockets at plug board 23. The usual plug connections are provided at this plug board and connected to the lower sockets are three-blade contacts 24 and 25. These sockets are shown in position for normal multiplying operations and may be shifted manually by member 26 to reverse positions for checking purposes to reverse the multiplier and multiplicand entries. The cross-wiring generally designated 27 provides for such reversal. Entry circuits extend in the usual way to the multiplier and multiplicand magnets 28MP and 28MC. The return circuit from the 28 MC and 28MP is direct to ground. Hand initiating control is cut off in the usual manner, that is, at the beginning of the second card feed cycle the closure of cam contacts FC—11 will cause energization of relay coil G. With G so energized, the three-blade contacts G—1 will be shifted to reverse position interrupting the circuit to the start key contacts 16 but maintaining the circuit to the FC—2 cam contacts. With G energized, contacts G—2 close and establish a stick circuit for coils G and H through either of the FC—2 contacts or the card lever contacts 19. The card ultimately passes to the receiving position in the punch, closing contacts 29 (see Fig. 2), energizing relay coil F, shifting F—1 to reverse position. As is customary, the punch contacts P—1, P—3 and P—5 are now closed. With P—5 closed, K will be energized and the K—1 contacts will be closed. With punch contacts P—3 closed, the punch clutch magnet 30 will be energized upon closure of cam contacts CC—3, the circuit being through K—1, P—3 to 30, CC—3 through F—1 in shifted position. The punch motor latch contacts 31 become latched closed in the usual manner, providing current supply for punch driving motor Z—2. The card now advances endwise through the punch in the customary manner.

On normal multiplying, LH reset initiates setting up of the cycle controller and actual multiplying. With coils F and K energized, contacts F—2 and K—2 (Fig. 3a) are closed. On closure of cam contacts CC—2, current flows from line 15, through CC—2, through the K—2 contacts, through now closed L—2 contacts, through supplemental checking contacts CK—1, through relay contacts F—2 now closed, through the 32LH reset magnet and back to ground. 32LH when energized, initiates reset in the customary manner (see Fig. 1). During LH reset, contacts 33 (Figs. 1 and 3d) close, causing energization of L and opening of L—2 to prevent repetition of reset. The stick circuit for L is through contacts L—1, the stick circuit extending back to line through P—2. L is de-energized in the usual way when contacts P—2 open. Upon LH reset, reset contacts 34 become closed and cause energization of relay coils M and N. This circuit will be traced as follows: From the 14 side of the line (Fig. 3d), through the contacts 34 which close on reset, through the checking contacts CK—2, through the line 35 (Figs. 3d, 3c, 3b and 3a), to the M and N relay coils and back to the other side of the line 13.

The column skip and cycle controller are of the usual type and fully described in Daly Patent No. 2,045,437. It is sufficient to state that if any brush of the multiplier readout stands on a zero spot, the corresponding Y relay coil of the cycle controller will be energized. Current will flow in from the D. C. line 14 (Fig. 3d), through the multiplicand reset contacts 36 now closed, to a line 37 (Figs. 3d, 3c, 3b and 3a), through the relay contacts M—2 now closed, via a wire 38, through the zero spots of MPRO, via the corresponding brush or brushes standing on the zero spot or spots and through the respective circuits shown, back to the 13 side of the D. C. line. Also connected to one side of the relay contacts M—2, is line 39 which extends over and connects to one side of the CS$u$—3 to CS$h$—3 control contacts, the other side of these contacts are wired back to their respective relay coils Y and therethrough to the other side of the D. C. line. Accordingly, when any Y coil is energized, due to a brush standing on a zero spot in its corresponding column the energization of this Y coil will close the related Y—1 stick contacts and such Y magnet will remain energized. For example, if there is a zero in the tens order, coil Y$t$ will be energized, but coils Y$h$ and Y$u$ will not have become energized.

The machine is now ready to multiply, which is brought about in the following manner: Energization of M closes relay contacts M—1 (Fig. 3a) and following the set up of the cycle controller, cam contacts CC—2 close and current flows through these contacts through M—1 now closed, through the Y$u$—2 transfer contacts, in the position shown, down through the CS$u$ relay magnet and out via the brush which is standing, say on the 5 spot of the MP readout in the units order, down through the fifth line of the group of wires generally designated 40 to the X5 multiplier relay magnet. As usual, there is a concurrent energization of CS$u$ and X5 and energization of X5 (Fig. 3b) selects and allows the proper impulses to flow for multiplication and the energization of CS$u$ directs the entries into the proper columnar orders of the RH and LH accumulators. The usual CS$u$—3 contacts close in the usual way to energize Y$u$ and shift the Y$u$—1 contacts and the Y$u$—2 contacts so that upon the succeeding multiplication by the next significant figure, the current flowing in through M—1 and CC—2 will be diverted by Y$u$—2 over the Y$t$—2 set of transfer contacts and so on. The flow of impulses for further partial products need not be traced in further detail. In the customary way, such impulses flow through the lines designated 41LH and the 41RH lines to the multiplicand readout MCRO. From this readout, impulses flow to the LH and RH component lines 42LH and 42RH, through the various contacts of the CS relays and ultimately to the 43LH and 43RH accumulator magnets.

Figure 3A:
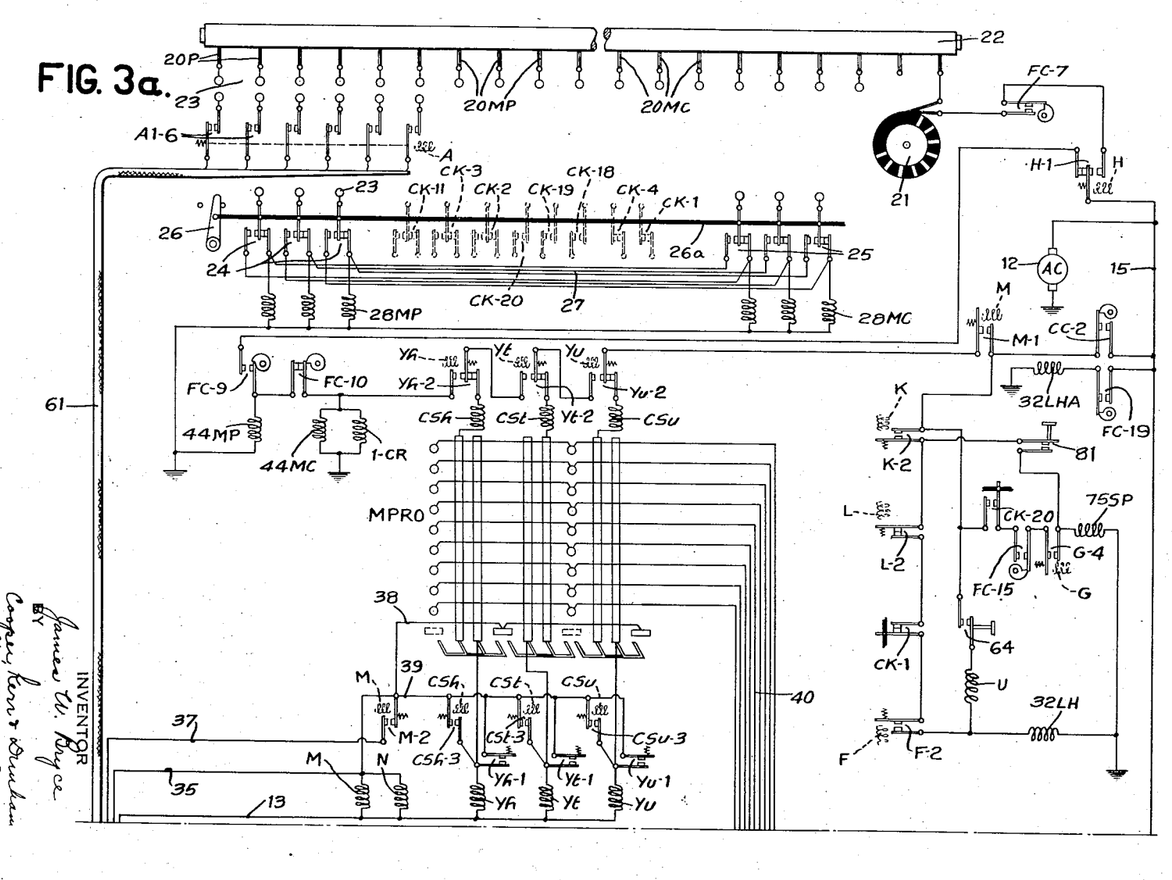
Figs. 3a, 3b, 3c and 3d, taken together and arranged vertically in the order named, show the circuit diagram of the machine.
Figure 3B:
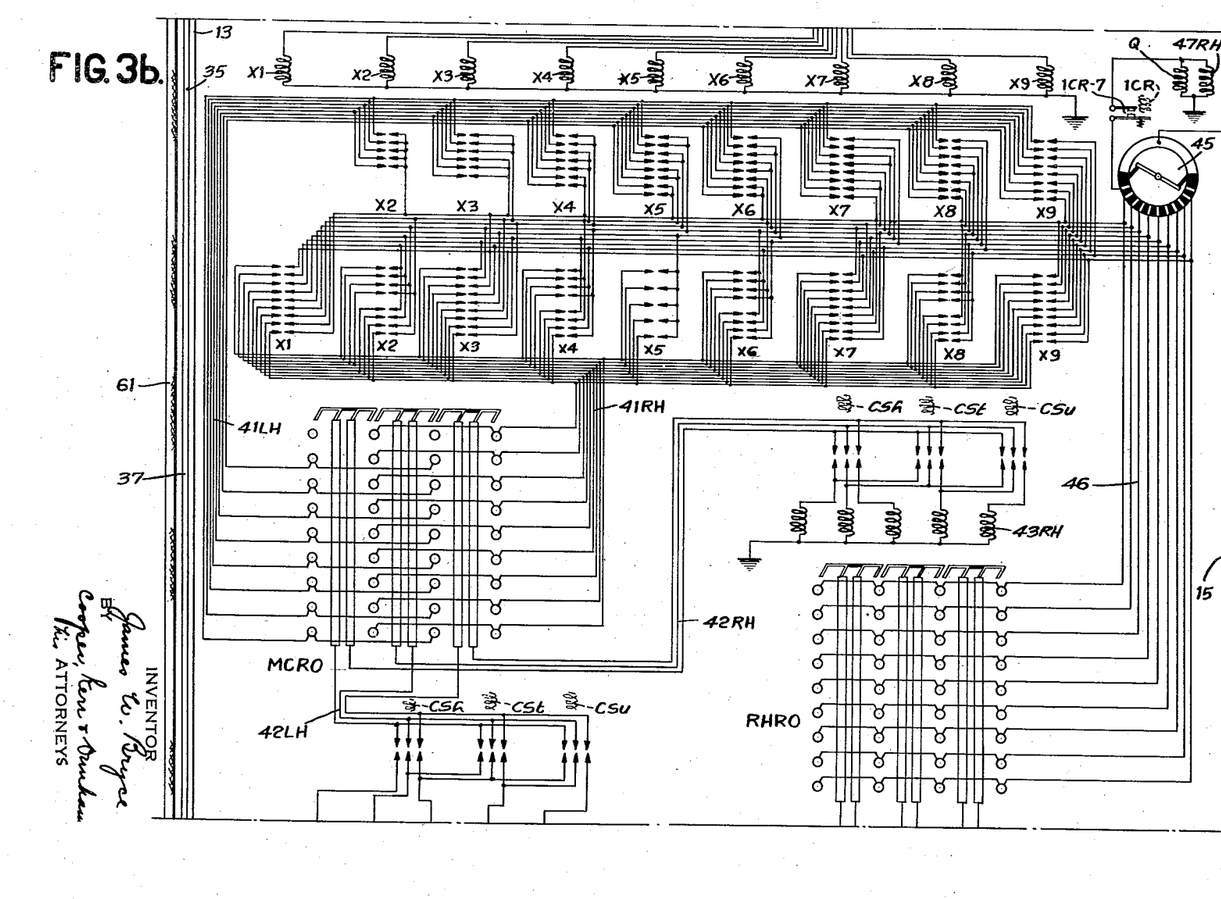

After multiplication is complete the transfer circuits in the cycle controller will all be shifted so that there will be an ultimate circuit both from the 15 side of the A. C. line through the shifted Y—2 set of transfer contacts to the 1—CR magnet and to the 44MC reset magnet. A branch circuit also extends through cam circuits FC—10 and to the 44MP reset magnets and back to ground. Energization of 44MP and 44MC initiates the reset of the related receiving devices. After a multiplying computation is complete RH to LH transfer occurs. This transfer operation is permitted by the energization of the multi-contact control relay 1CR (Fig. 3a). With this relay energized, contacts 1CR—1—6 (Fig. 3c), become closed and an extra contact 1CR—7 (Fig. 3b) is closed. Closure of 1CR—1—6 connects RHRO with the 43LH accumulator magnets so that upon the operation of the emitter 45 (Fig. 3b) impulses are emitted through the lines 46, through RHRO, through the 1CR—1—6 contacts (Fig. 3c) to the 43LH accumulator magnets. The amount previously standing in RH is entered into LH in proper columnar relation. At the completion of this operation the brush of emitter 45 on encountering the extra spot supplies current through contacts 1CR—7 to the 47RH reset magnet. On normal multiplying, MC and MP reset occurs concurrently with LH and RH transfer. The reset of the MC device will cause the opening of contacts 36 (Fig. 3d) and break the stick circuit for relay coils M and N and for all the Y magnets, thus preparing the cycle controller for a new entry from the following card. MC reset also causes closure of contacts 48, which causes energization of relay C through the CK—3 contacts now in the position shown and the closure of contacts 36a causes the energization of relay D. With C energized, there is a reclosure of C—1 and a re-initiation of card feed by a re-energization of the card feed clutch magnet 17. The circuit is as follows: from the 13 side of the line, through F—1 in the position shown, through 17, through FC—6, stop key contacts 18, through N—1 and C—1 and P—1 to the other side of the line. Before or upon punching of the product amount, there is a transfer of the product from LH into SP. With D energized (Fig. 3d), a stick circuit is established through D—2 and CC—1. With D energized, relay contacts D—1 (Fig. 3c) close and provide current supply to the emitter 49 from the 15 A. C. line. Emitter 49 emits impulses through one section of LHRO, through plug connections at plug board 50, through the CK—5—10 contacts in the position shown (Fig. 3c) to the 51SP accumulator magnets. In this way the amount of the product is transferred into SP.

The machine is now ready to punch out the product on the record. This is initiated as follows: Early in the reinitiated card feed cycle, cam contacts FC—4 (Fig. 3d) close energizing relay coil B, through switch 90b now down, closing stick contacts B—2 and providing a stick circuit for B, through K—3 contacts now closed. With B energized, relay contacts B—1 also close establishing a circuit from the 14 side of the line, through B—1, through escapement contacts 52 on the punch, through the CK—11 contacts now in the position shown, through line 53 (see Fig. 3c) to the common conducting strip 54 in the punch. With current supplied to the readout strip 54 in this manner and with the brush 55 standing on the first of the spots 56 at the first product punching position, punching will commence, there being a readout in the usual way through the related section of LHRO and an energization of the usual punch selector magnets 57. With relay contacts B—1 closed, current is supplied to contacts 58 in the punch (these being the interposer control contacts) so that current is supplied to the punch operating magnet 59. Punching operations then proceed in the usual way and finally the card will pass to beyond the last column position, punch contacts P—5 will be closed (Fig. 3d) energizing relay coil K, and closing the K—1 contacts (Fig. 3d) to establish a circuit to the eject magnet 60. A new operation will then be initiated upon a succeeding record card. Such succeeding operation is initiated upon closure of contacts K—2 (Fig. 3a) which brings about LH reset and LH reset brings about a new multiplying operation.

At the end of a regular multiplying run, after the last card has passed out of the machine, the last product will remain in the LH accumulator and ordinarily with previous multiplying machines, this accumulator was cleared by the preliminary operation preceding the starting up of multiplying on a new card run. However, when the machine is to be used for checking purposes, a special control is provided for clearing out the last product amount from the LH accumulator. Before pressing the start key on a check run, a special LH accumulator reset key is depressed to close contacts 64 (Fig. 3a) and energize 32LH at the time when current supply is provided upon the closure of cam contacts CC—2. The LH accumulator is in this way cleared out of the last product before a check run is started. SP reset is brought about by depressing SP reset key 81.

The foregoing has described the operation for regular multiplying. The sequence of operation is substantially that of Daly Patent No. 2,045,437. In the previous description, reference has been made to various CK contacts. All of the various CK contacts are shiftable contacts which for normal multiplying operations are in the position shown and all of these CK contacts are shiftable to a reverse position from that shown by the shifting of the manual member 26 (Fig. 3a). Manual member 26 is connected to an operating member 26a which member 26a in addition to shifting the entry reversing contacts 24 and 25 for the multiplier and multiplicand also positions all of the CK contacts.

The operations will now be described for a checking run. Under this operation a set of cards which have been previously computed and which have the product amounts punched thereon will be placed in the supply magazine. Before starting up the machine, the manual member 26 (Fig. 3a) will be shifted to reverse position from that shown and this shifting movement will, in the usual way, reverse the entry relations of the multiplier and multiplicand. Plug connections will furthermore be made from the brushes 20P pertaining to the product at plug board 23 to direct the product entries read from the card through contacts A—1 to 6 into SP. The machine operations will then be started up in the same way as explained before, that is, after clearing the LH accumulator by depressing the special reset key which closes contacts 64 (Fig. 3a) as before described, the start key will be operated to close start key contacts 16 (Fig. 3d). With relay coil H energized in the manner previously explained for regular multiplying operations, relay contacts H—3 and H—4 (Fig. 3d) become closed. The checking contacts CK—18 are also now in shifted position and closed and accordingly a circuit is established from line 14, through CK—18 (now closed), through relay contacts H—3 now closed, through FC—18 which closes at the proper time in the cycle to energize relay coil A. Relay coil A closes contacts A—1 to 6 (Fig. 3a) and such contacts are closed during the first machine cycle of the two cycles on card feed when amounts are being read from the card. With such contacts A—1 to 6 so closed, the product amount will be read from the card and the product entries will flow through wires in cable 61 (Figs. 3a, 3b and 3c) to and through the CK—12—17 contacts now in shifted position and to the 51SP accumulator magnets. Accordingly, the amount of the product as read from the card will be entered into the SP accumulator on the first machine cycle of the two machine cycles of a card feeding cycle.

It will be recalled that the following operation is to transfer the complement of the product standing in SP into the LH accumulator. This is brought about in the following manner: Referring to Fig. 3d, with contacts CK—18 in shifted position, a circuit is established through contacts FC—16 at the time shown in the timing diagram, through the contacts H—4 now closed, and through relay coil J. With relay coil J energized, contacts J—1 (Fig. 3c) become closed, supplying current to emitter 62. The SP accumulator is provided with an inverter type of readout designated SPRO on Fig. 3c and from this inverter readout a set of lines 63 are provided which extend through now shifted three-blade J—2—7 contacts to provide for the entry of the complement of the product standing in SP into the LH accumulator, the impulses now flowing to the 43LH accumulator magnets. This occurs during the second machine cycle of the card feed cycle as shown on the timing diagram.

It will be recalled that for normal multiplying operations, multiplying was initiated by an LH reset operation, which LH reset occurred at a cycle immediately preceding the first multiplying cycle. With the machine utilized for checking, such LH reset cycle is dispensed with. Referring now to Fig. 3a, the previous LH reset initiating circuit extended through contacts K—2, L—2, CK—1 and F—2. However, on a checking operation, contacts CK—1 are in open position reverse from the position shown and accordingly there is no automatic LH reset initiated through this circuit since the circuit is broken at CK—1. It will be recalled that the LH accumulator had been previously cleared by a hand controlled operation preceding the check run. Inasmuch as no LH reset occurs a special initiating control must be provided to bring about the energization of relay coils M and N for causing setup of the cycle controller and initiating multiplying. This special initiating circuit is as follows: from line 14 (Fig. 3d), through relay contacts G—3 now closed, through cam contacts FC—14 now closed, through the checking contacts CK—2 now in shifted position to line 35 and via line 35 (Figs. 3d, 3c, 3b and 3a) to relay coils M and N, which coils become energized upon the closure of FC—14 which is the initiating control for this type of operation. It will be recalled that for normal multiplying the previous pick-up circuit for relay coils M and N was through the LH reset contacts 34, but these contacts are now ineffective because no LH reset occurs at this time and contacts CK—2 are in shifted position. The machine now proceeds with the multiplication in the usual way, it being recalled that the multiplier and multiplicand were reversed upon entry.

It may be explained that after the complement of the read in product is directed into LH that on subsequent multiplying cycles, relay J is de-energized upon opening of FC—16 and the three-blade contacts J—2—7 shift back to the position shown. In such position the LH components of products are directed into the LH accumulator and such product components also are directed into the supplemental LH accumulator designated LHA and provided with counter magnets 43LHA (see Fig. 3c). Finally an RH to LH transfer cycle occurs at the customary time and at the end of such cycle if the product amount read from the card is exactly the same as the product amount which is recomputed by the multiplying devices, there will be a setting of the LH accumulator to zero after the RH to LH transfer. This will be self-evident from the fact that if the computed product is added to the true complement of the product read from the card, the result will be zero, if such products were the same. It will be understood that the RH to LH transfer not only occurs into LH, but also into LHA so that at the end of a calculation upon checking after RH to LH transfer, the complete product will be set up on LHA.

At the end of the RH to LH transfer cycle, upon emitter 45 encountering the extra spot current flows through the 1CR—7 contacts now closed (see Fig. 3b), to energize the 47RH reset magnet. In shunt with such reset magnet is a relay coil Q, which, when energized, closes relay contacts Q—1 (Fig. 3d). With such relay contacts Q—1 closed, a pickup circuit is established for relay coil E as follows: from the 14 line through CK—18 now shifted, through relay contacts Q—1 now closed, to relay coil E and back to line 13. With relay coil E thus energized, a stick circuit is established through relay contacts E—1 and cam contacts FC—17. Such relay circuit through E is maintained for a time after the emitter 45 passes the extra spot and is maintained energized until a new card feed cycle occurs. With relay coil E energized, relay contacts E—2 (Fig. 3c) become closed and remain closed and upon the closure of cam contacts CC—7 at the time shown in the timing diagram a so-called zero test circuit is established through the zero spots of LHRO. Before tracing this circuit it may be explained that if the readout brushes stand at zero in all orders that it is intended that there be an immediate re-initiation of card feed. Card feed is initiated by energizing relay coil C and the re-initiating circuit is as follows: from line 14 (Figs. 3d and 3c), through the CK—19 checking contacts now closed to the zero spot in the highest order of LHRO, thence via brush 68, to a collector ring and to and through wire 69, a plug connection at 50, through the lowermost wire of the 67 group, through the CK—5 contacts now in shifted position, through the CK—6 contacts now in shifted position, back by the second wire from the bottom of the 67 group, through a plug connection at plug board 50, via wire 70 to the collector ring, thence via brushes 71 and 72 likewise on a zero spot, down through the collector ring, via wire 73, via plug connection over via the third wire from the bottom of the 67 group, through the CK—7 contacts now shifted, through the CK—8 contacts now shifted, back on the fourth wire from the bottom of the 67 group, over a plug connection at 50, via wire 74 to the collector ring, via brush 76 to the zero spot, thence via brush 77 to the collector ring, back via wire 78, via plug connection to the second wire from the top of the 67 group, through CK—9 and CK—10 now shifted, back via the top wire, via a plug connection to wire 79 to the collector ring to brush 80 and out via the last zero spot to a circuit 65 which leads through the now closed E—2 contacts. Upon closure of the CC—7 contacts, the circuit is completed to wire 66 (Figs. 3c and 3d), wire 66 extending down through the CK—3 contacts now shifted and back through relay coil C to the other side of the line 13. The energization of C brings about immediate re-initiation of card feed and a checking operation then follows on a following card. When a checking comparison is made no LH reset involving an extra machine cycle is required because the LH accumulator is brought back to zero as an incident to the comparing operation and in this way there is a saving of LH reset cycle time on checking operations when checking comparisons match.

If the re-computed amount does not compare with the read in product amount which is transferred as a complement to LH, the above mentioned card feed initiating circuit is not set up, and card feed is thereupon deferred and suspended. This will apprise the operator that there is an incorrect card in the punch. This card is in the punch at a position under the punches ready to be skipped out, but it is retained in such position and it can be removed by hand. On checking operations, due to the shift of relay contacts CK—11, there will be no punching effected on cards which are checked. When there has been a failure of comparison on a checking operation after the removal of the improper card, the product perforated at the card may be visually checked against the reading on the LHA accumulator which reading is still retained in such accumulator.

To start the machine in operation after a non-matching card has been so compared by the operator, the operator depresses the key 64 (Fig. 3a) and upon closure of CC—2, the 32LH reset magnet is energized. This clears the LH accumulator to zero, it being recalled that this accumulator would not stand wholly at zero if a comparison did not take place. After such accumulator has been cleared to zero, another test circuit is established through the serial circuit through the zero spots of LHRO and such circuit on being completed again brings about an energization of the C relay to start card feed for the next card. As soon as card feed starts upon closure of the FC—19 cam contacts (Fig. 3a) a circuit is established to the 32LHA reset magnet so that this supplemental LHA accumulator becomes reset prior to the multiplying cycle.

It may be explained that on checking computations, in place of SP being reset by hand control involving the hand closure of the SP reset contacts numbered 81 (Fig. 3a) that there is an automatic reset circuit to bring about SP reset during the first multiplying cycle. The automatic reset circuit under this condition of operation is as follows: Referring to Fig. 3a, from line 15, through CC—2, through contacts CK—20 now in closed position, through FC—15, through relay contacts G—4, to and through the 75SP reset magnet and back to ground. It may be explained that the energization of 75SP occurs at the end of the card feed cycle just preceding the first multiplying cycle, but that actual SP reset occurs during the first multiplying cycle. The relay contacts G—4 in the energizing circuit to the 75SP reset magnet prevent premature SP reset during the preliminary card feed cycle in the following manner. The relay G is not energized until after the preliminary card feed cycle is completed, i. e. during the second card feed cycle. When cam contacts FC—11 close, relay G is energized, card lever contacts 19 being closed at this time. During the preliminary card feed cycle, card lever contacts 19 are not closed at the time cam contacts FC—11 close.

On check runs, provision is made whereby the machine may automatically punch a special perforation in the card at the X position (i. e. at index point position 11) in the event that a card checks and to suppress such punching in the event that the card does not check. This feature may be optionally used or not as desired by the operator.

On check runs provision is also made to immediately release the card and allow it to be rejected on the card feed cycle following checking. In this way there is no delay attendant upon advancing the card step by step through the punching mechanism upon checking operations, which step by step feed of the card might possibly require extra machine cycle time. With the card so skipped through the punch all punch magnet operations and interposer operations are suppressed except the operation for the X interposer magnet which may or may not be required, depending upon whether an X is to be punched in a check card or if such X perforation left out.

Figure 3C:
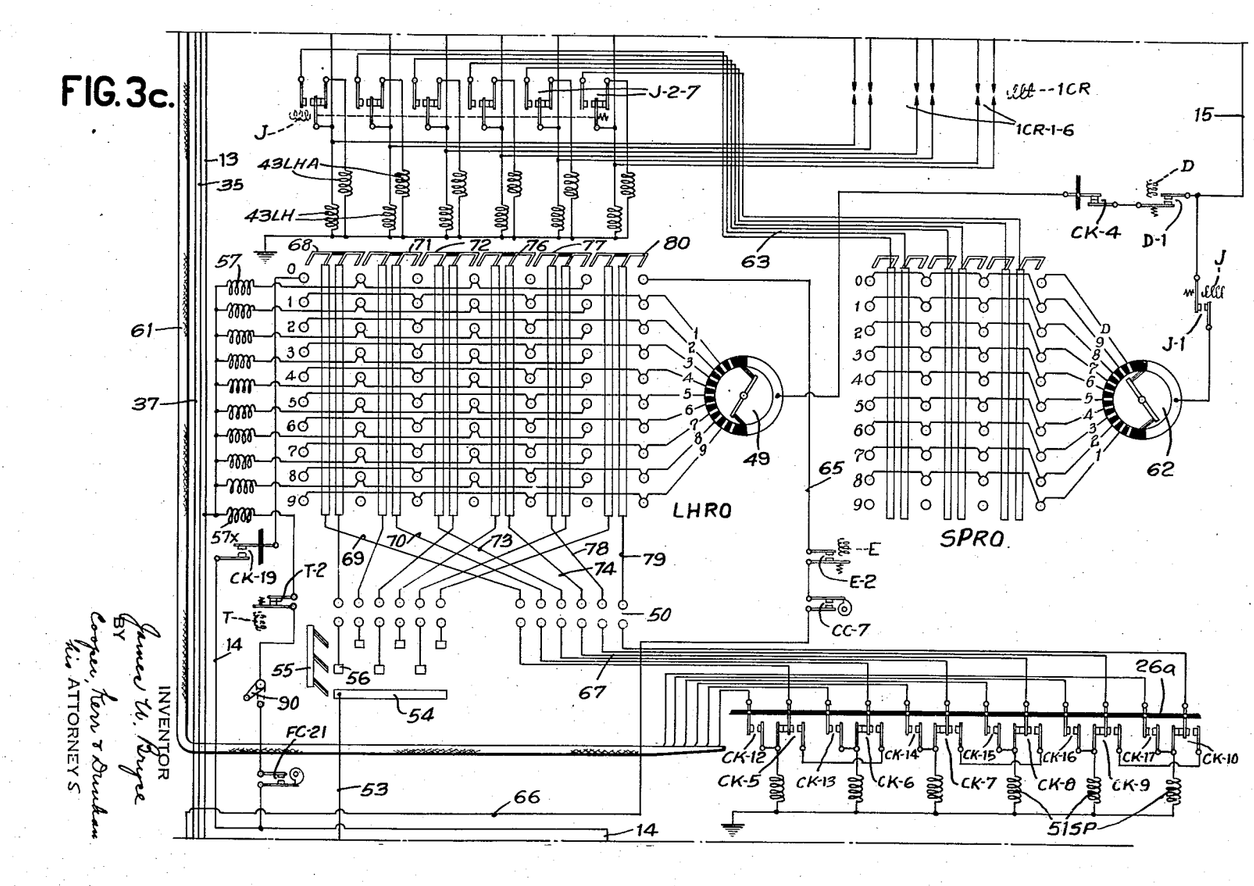
Figure 3D:
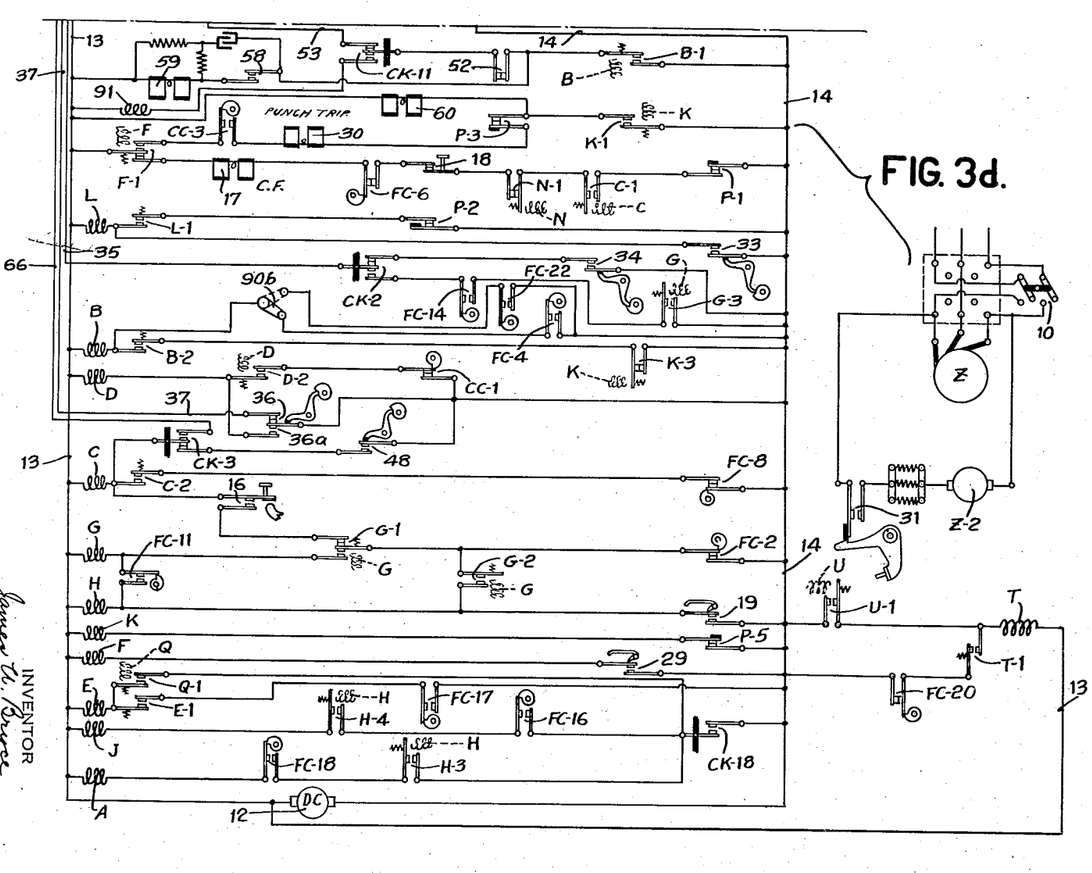

Referring first to Fig. 3c and Fig. 3d, switching means 90 and 90b, which preferably comprise a single switch of double pole type, are provided. Such switching means are disposed in the position shown for normal first run multiplying operations or for checking operations wherein no X perforation is to be placed in a card upon checking. Referring again to Fig. 3c, the X interposer magnet of the punch is designated 57 and it is disposed in a circuit including normally closed T—2 contacts extending through the switch 90, which is closed for X punching on a card. A circuit is completed through the FC—21 contacts and back to line. Upon closure of FC—21, the X interposer magnet 57X will be energized, causing an extra perforation to be punched in the check card signifying that the card checks. If the card does not check, card feed will be suspended before the FC—21 cam contacts close so that there will be no energization of the 57X magnet under this condition of operation. When a card does not check LH reset is initiated in the manner previously explained by closing the special reset key 64 (Fig. 3a). Disposed in the circuit including such reset key is a relay coil U. With relay coil U energized upon closure of the special reset key the relay contacts U—1 (Fig. 3d) will become closed bringing about energization of relay coil T. Relay coil T when energized will be maintained energized by a stick circuit extending back to line through stick contacts T—1 and cam contacts FC—20. With relay coil T energized, contacts T—2 (Fig. 3c) will become open and accordingly during the card feed cycle which immediately follows, there will be no energization of the 57X magnet and accordingly such non-checking or improper card will not be X punched. It may be explained that T is maintained energized during the entire time that cam contacts FC—21 are closed and that T only becomes de-energized after such cam contacts FC—21 re-open. It will be understood that the X punching feature may be used or not as desired by shifting the switch 90. As explained before switch 90 has associated with it a second pole or supplemental switch 90b (Fig. 3d) which is placed in the lower position for first run operations or for checking without X punching and which is placed in the upper position for checking operations with X punching. When in the lower position the usual pickup circuit for relay coil B is provided through the cam contacts FC—4. When in the upper position the pickup circuit for relay coil B is through cam contacts FC—22 which are timed to close somewhat later than cam contacts FC—4 to give time for X punching before releasing the card. To provide for the automatic release of a card upon checking the circuit from the lower of the CK—11 contacts (Fig. 3d) in place of extending to the punch magnet 59 as in previous machines is extended to a special release magnet 91, which magnet when energized, is adapted to release the card for immediate excursion through punch to eject position. Magnet 91 functions and operates in the same manner as magnet 152 of United States patent to Carroll No. 1,976,600 (see Fig. 18 of such patent). Such magnet of the Carroll patent releases the card by bringing about a magnetically controlled depression of the release key (see key 168, Fig. 17 of the Carroll patent). It will be understood that magnet 91 (the release key operating magnet corresponding to the magnet 152 of the Carroll patent) will become energized upon closure of the B—1 contacts, which contacts close upon the energization of relay coil B. Relay coil B is energized upon closure of cam contacts FC—22 in case an X is to be punched or by cam contacts FC—4 in case no X is to be punched. Whichever way relay coil B is energized there is an immediate release of the card and it immediately passes to the eject position in the punch. In this way punch operating time is saved and the possibility of extra machine cycles being required to provide time for bringing the card to the eject position is obviated.

With the construction described, it is unnecessary to remove the plug connections at plug board 50 upon changing from regular multiplying with accumulation of products in SP to checking or back to regular multiplying. The CK—5—10 contacts provide this result in that upon checking they disconnect the 51SP magnets from the LH readout and such contacts recoordinate the LHRO circuits to provide the test circuit through the zero spots. The CK—12—17 contacts on checking operations with 26a displaced to the left, permit an entry from the card into the SP accumulator.

Summarizing, the general mode of operation is as follows: The machine functions for normal multiplying in the manner of previous machines in this art. When set for checking purposes, however, the cyclic operations are so altered to dispense with accumulator cycles or machine cycles which have heretofore been required for comparing and resetting. The cycles which are dispensed with comprise a comparing cycle previously required and a separate and additional LH reset cycle previously required. Briefly, on the first machine cycle of a card feed cycle, MC, MP and the product are entered into MP, MC and SP with the reversal of the MC and MP entries as before. On the next machine cycle, the complement of the product is read out from SP and entered into LH. The usual multiplying cycles then ensue and upon the completion of the RH to LH transfer and in the same machine cycle, if the product read from the card checks with the re-computed product, there is an immediate check of this fact by the testing of the zero status of the LH accumulator. If the LH accumulator is at zero, a further card feed is immediately initiated on the next following machine cycle and inasmuch as the LH accumulator is at zero no reset of such accumulator is necessary and no cycle is required for such reset. If on the other hand there is not a checking comparison, one extra cycle is required to clear the LH accumulator by a hand initiated operation. In short, in Fig. 5 there are five machine cycles delineated for a check of a card. With prior art checking machines, eight machine cycles would be required. Accordingly, checking operations are materially expedited because two machine cycles are saved for each card checked.

What I claim is:

1. In a checking machine comprising record feeding means for feeding a succession of records in intermittent record feeding and reading cycles, record controlled factor receiving means for receiving factors of a computation to be checked, multiplying means controlled thereby including result receiving means for receiving a product computed by said multiplying means in a series of machine cycles including multiplying cycles, a record controlled receiving means for receiving a product amount derived from a record and resulting from a previous multiplication of the same factors; including in combination, means to transfer the complement of the product amount from the last mentioned receiving means to the result receiving means before the latter receives the product computed by the multiplying means, said result receiving means being brought to a zero status during the machine cycle in which the computed product is completely entered therein upon the agreement of the product derived from the record with the computed product, means to test the on zero condition of the result receiving means during the machine cycle in which the computed product is fully entered therein, and means controlled by said testing means to initiate a record feed of a following record by the record feeding means.

2. In a machine according to claim 1 wherein cyclically operated means are provided to control said complemental transfer means so as to bring about a complemental transfer during a machine cycle immediately following the record reading cycle, whereby no separate machine cycle is consumed by a complemental transfer operation.

3. In a machine according to claim 1 wherein clearing means are provided for the receiving means which receives the pre-computed products from the records and wherein further cyclically operated control means are provided to cause said clearing means to function during a multiplying cycle of the machine, whereby no separate cycle is required for the clearing operation.

4. A machine according to claim 1 including an accumulator for receiving computed products and for retaining same after completion of a checking operation; clearing means for said accumulator, and cyclically operated means for initiating operation of said clearing means upon record feed following a checking operation.

5. A machine according to claim 1 wherein cyclically operated means cooperating with the means controlled by the testing means are provided to cause initiation of feed of a new record in a machine cycle immediately following the cycle in which the computed product is fully entered into the result receiving means.

6. A machine according to claim 1 including means for perforating a special designation perforation on each record following operations upon data derived therefrom which operations result in a zero status of the result receiving means, said perforating means being controlled by elements of the record feeding means.

7. In a checking machine for checking previously calculated products as recorded on record cards, including record feeding means, record reading means for product amounts, multiplier amounts and multiplicand amounts, receiving means for such amounts, multiplying means controlled by the multiplier and multiplicand receiving means, result receiving means for receiving a product computed by said multiplying means in a series of machine cycles and including in combination, means for causing transfer of the complement of the product received from the record from the receiving means therefor into the result receiving means for products computed by the multiplying means so that the result receiving means will be zeroized if the recorded product equals the computed product, means to test the result receiving means in the same cycle in which it has completely received the computed product to determine whether it stands at zero and means controlled by said testing means when the result receiving means stands at zero for initiating operation of the record feeding means in a cycle immediately following said last cycle.

8. In a record controlled machine for checking a recorded product derived from a record with a product re-computed from corresponding factors upon said record, and including signifying instrumentalities which signify agreement or disagreement of a recorded product and a re-computed product; including in combination record feeding means for feeding successive records through the machine under control of said signifying instrumentalities, said signifying instrumentalities initiating record feed only upon signification of agreement, perforating mechanism of the step by step type through which successive records pass, said perforating mechanism including means for escaping each record step by step therethrough, and means controlled by elements of said record feeding means for disabling the escaping means to cause a record to be skipped through the perforating mechanism.

9. A machine according to claim 8 wherein said perforating mechanism comprises a special perforation device and wherein elements of said record feeding means enable said special perforation device to cause a special perforation to be effected before the card is skipped through the perforating mechanism.

10. In a record controlled machine for checking a recorded product derived from a record with a product re-computed from corresponding factors upon said record, and including signifying instrumentalities which signify agreement or disagreement of a recorded product and a re-computed product; including in combination record feeding means for feeding successive records through the machine under control of said signifying instrumentalities, said signifying instrumentalities initiating record feed only upon signification of agreement, perforating mechanism of the step by step type through which successive records pass, said perforating mechanism including means for perforating a special perforation on records passing therethrough, means controlled by elements of the record feeding means upon initiation of record feeding by the signifying instrumentalities for calling said special perforating means into action to effect a special perforation upon a record, whereby a special perforation is effected on a record only when the signifying means signifies agreement and initiates record feeding.

JAMES W. BRYCE.